(12) United States Patent
Archer

(10) Patent No.: US 12,552,457 B2
(45) Date of Patent: Feb. 17, 2026

(54) SYSTEMS AND METHODS FOR STRUCTURAL CAB INTEGRITY

(71) Applicant: Oshkosh Corporation, Oshkosh, WI (US)

(72) Inventor: David W. Archer, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 510 days.

(21) Appl. No.: 17/993,088

(22) Filed: Nov. 23, 2022

(65) Prior Publication Data

US 2023/0159104 A1    May 25, 2023

Related U.S. Application Data

(60) Provisional application No. 63/282,988, filed on Nov. 24, 2021.

(51) Int. Cl.
| | |
|---|---|
| *B62D 21/15* | (2006.01) |
| *A62C 27/00* | (2006.01) |
| *B62D 21/18* | (2006.01) |

(52) U.S. Cl.
CPC .............. *B62D 21/15* (2013.01); *A62C 27/00* (2013.01); *B62D 21/18* (2013.01)

(58) Field of Classification Search
CPC ....... B62D 21/15; B62D 21/18; B62D 33/067
See application file for complete search history.

(56) References Cited

U.S. PATENT DOCUMENTS

| | | | |
|---|---|---|---|
| 6,520,565 B1 * | 2/2003 | Kjellberg | B62D 21/152 |
| | | | 296/190.08 |
| 2003/0230412 A1 | 12/2003 | Archer | |
| 2003/0230863 A1 | 12/2003 | Archer | |
| 2004/0039510 A1 | 2/2004 | Archer et al. | |
| 2005/0001400 A1 | 1/2005 | Archer et al. | |
| 2006/0021764 A1 | 2/2006 | Archer et al. | |
| 2006/0022001 A1 | 2/2006 | Linsmeier et al. | |
| 2006/0032701 A1 | 2/2006 | Linsmeier et al. | |
| 2006/0032702 A1 | 2/2006 | Linsmeier et al. | |
| 2006/0065411 A1 | 3/2006 | Linsmeier et al. | |

(Continued)

FOREIGN PATENT DOCUMENTS

| | | | | |
|---|---|---|---|---|
| CN | 101541621 B | * | 2/2012 | ........... B62D 21/152 |
| JP | H0356464 Y2 | * | 12/1991 | |

(Continued)

*Primary Examiner* — Hilary L Gutman
(74) *Attorney, Agent, or Firm* — Foley & Lardner LLP

(57) ABSTRACT

A fire fighting vehicle comprising a frame member, a catch coupled with the frame member, and a rear assembly coupled to the frame member. The fire fighting vehicle further includes a cab rotatably coupled with the frame member and supported by a forward portion of the frame member. The cab includes a cab frame member coupled with the frame member, a cab cross-member coupled with the cab frame member, the cab cross-member extending laterally from the cab frame member, and a pin coupled with the cab cross-member. The fire fighting vehicle includes the catch coupled with the frame member rearward relative to the pin, and where in response to a force being applied to a front portion of the cab, the cab is configured to rotate about a lateral axis and the pin is configured to engage the catch.

16 Claims, 11 Drawing Sheets

(56) References Cited

U.S. PATENT DOCUMENTS

| | | |
|---|---|---|
| 2006/0086566 A1 | 4/2006 | Linsmeier et al. |
| 2006/0180322 A1 | 8/2006 | Archer et al. |
| 2010/0289238 A1 | 11/2010 | Archer et al. |
| 2014/0246265 A1 | 9/2014 | Archer et al. |
| 2016/0144211 A1 | 5/2016 | Betz et al. |
| 2016/0145941 A1 | 5/2016 | Betz et al. |
| 2016/0304051 A1 | 10/2016 | Archer et al. |
| 2018/0215354 A1 | 8/2018 | Linsmeier et al. |
| 2018/0215597 A1 | 8/2018 | Linsmeier et al. |
| 2018/0297597 A1 | 10/2018 | Linsmeier et al. |
| 2019/0106083 A1 | 4/2019 | Archer et al. |
| 2019/0262646 A1 | 8/2019 | Linsmeier et al. |
| 2019/0263408 A1 | 8/2019 | Linsmeier et al. |
| 2019/0359184 A1 | 11/2019 | Linsmeier et al. |
| 2019/0359460 A1 | 11/2019 | Linsmeier et al. |
| 2020/0038700 A1 | 2/2020 | Betz et al. |
| 2020/0039804 A1 | 2/2020 | Betz et al. |
| 2020/0047013 A1 | 2/2020 | Betz et al. |
| 2020/0056426 A1 | 2/2020 | Betz et al. |
| 2020/0130653 A1 | 4/2020 | Betz et al. |
| 2020/0231131 A1 | 7/2020 | Archer et al. |
| 2021/0178206 A1 | 6/2021 | Betz et al. |
| 2021/0229628 A1 | 7/2021 | Archer et al. |
| 2021/0244982 A1 | 8/2021 | Betz et al. |
| 2021/0253102 A1 | 8/2021 | Linsmeier et al. |
| 2022/0009761 A1 | 1/2022 | Archer et al. |
| 2022/0017048 A1 | 1/2022 | Betz et al. |
| 2022/0024425 A1 | 1/2022 | Linsmeier et al. |
| 2022/0074417 A1 | 3/2022 | Linsmeier et al. |
| 2022/0112060 A1 | 4/2022 | Archer et al. |
| 2022/0112061 A1 | 4/2022 | Archer et al. |
| 2022/0177055 A1 | 6/2022 | Archer |
| 2022/0242713 A1 | 8/2022 | Betz et al. |
| 2022/0355140 A1 | 11/2022 | Linsmeier et al. |
| 2022/0355141 A1 | 11/2022 | Linsmeier et al. |
| 2022/0355142 A1 | 11/2022 | Linsmeier et al. |
| 2022/0379892 A1 | 12/2022 | Archer et al. |

FOREIGN PATENT DOCUMENTS

| | | | | |
|---|---|---|---|---|
| JP | H06115463 A | * | 4/1994 | |
| JP | H08175440 A | * | 7/1996 | |
| JP | 08230724 A | * | 9/1996 | ............ B62D 21/15 |
| JP | 08268347 A | * | 10/1996 | |
| JP | H0958531 A | * | 3/1997 | |
| JP | 3038087 B2 | * | 5/2000 | |
| JP | 3266228 B2 | * | 3/2002 | |
| JP | 2010125881 A | * | 6/2010 | |
| JP | 2019025945 A | * | 2/2019 | |

* cited by examiner

SYSTEMS AND METHODS FOR STRUCTURAL CAB INTEGRITY

CROSS-REFERENCE TO RELATED PATENT APPLICATIONS

This application claims the benefit of and priority to U.S. Provisional Application No. 63/282,988, filed on Nov. 24, 2021, the entire disclosure of which is hereby incorporated by reference herein.

BACKGROUND

A firefighting vehicle includes a chassis and a cab that is often positioned at a forward position on the chassis. In instances when the cab experiences a force, for example the firefighting vehicle is involved in an accident, it is desirable for the cab and other components of the firefighting vehicle to maintain their structural integrity.

SUMMARY

One exemplary embodiment relates to a firefighting vehicle. The fire fighting vehicle includes a chassis having a frame member, the chassis coupled with a plurality of wheels. The fire fighting vehicle also includes a catch coupled with the frame member, and a rear assembly coupled to the frame member, the rear assembly supported by a rearward portion of the frame member. The fire fighting vehicle further includes a cab rotatably coupled with the frame member, the cab supported by a forward portion of the frame member and the frame member extending longitudinally between the cab and the rear assembly. The cab includes a cab frame member coupled with the frame member, the cab frame member extending longitudinally between a front end of the cab and a rear end of the cab. The cab also includes a cab cross-member coupled with the cab frame member, the cab cross-member extending laterally from the cab frame member, and a pin coupled with the cab cross-member. The fire fighting vehicle includes the catch coupled with the frame member rearward relative to the pin, and where in response to a force being applied to the front end of the cab, the cab is configured to rotate about a lateral axis and the pin is configured to engage the catch.

Another exemplary embodiment relates to a firefighting vehicle. The fire fighting vehicle includes a chassis having a frame member, the chassis coupled with a plurality of wheels. The fire fighting vehicle also includes a catch coupled with the frame member, and a rear assembly coupled to the frame member, the rear assembly supported by a rearward portion of the frame member. The fire fighting vehicle further includes a cab rotatably coupled with the frame member, the cab supported by a forward portion of the frame member and the frame member extending longitudinally between the cab and the rear assembly. The cab includes a cab frame member coupled with the frame member, the cab frame member extending longitudinally between a front end of the cab and a rear end of the cab. The cab also includes a cab cross-member coupled with the cab frame member, the cab cross-member extending laterally from the cab frame member. The cab further includes a pin coupled with the cab cross-member, where wherein in a first position the catch and the pin are separated longitudinally by a first distance, and in a second position the catch and the pin are separated longitudinally by a second distance, the second position responsive to a force being applied to the front end of the cab.

Another exemplary embodiment relates to a cab assembly. The cab assembly includes a cab body, and a cab frame member extending longitudinally between a front end of the cab body and a rear end of the cab body. The cab assembly also includes a cab cross-member coupled with the cab frame member, the cab cross-member extending laterally from the cab frame member, and a pin coupled with the cab cross-member, where the in in response to a force being applied to the front end of the cab body, the cab body is configured to rotate about a lateral axis and the pin is configured to engage a catch.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
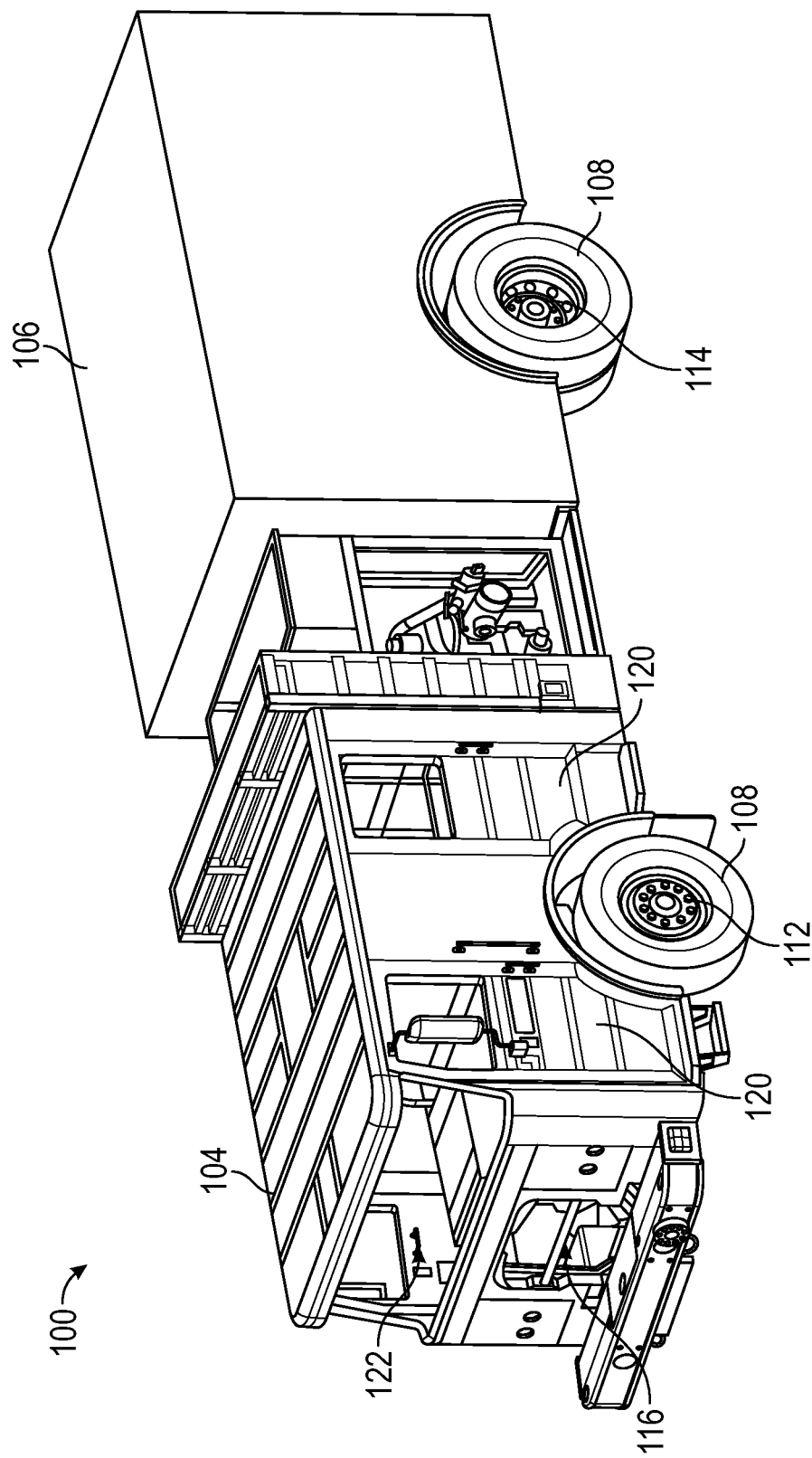
FIG. 1 is a front, left perspective view of a firefighting vehicle, according to an exemplary embodiment.
Figure 2:
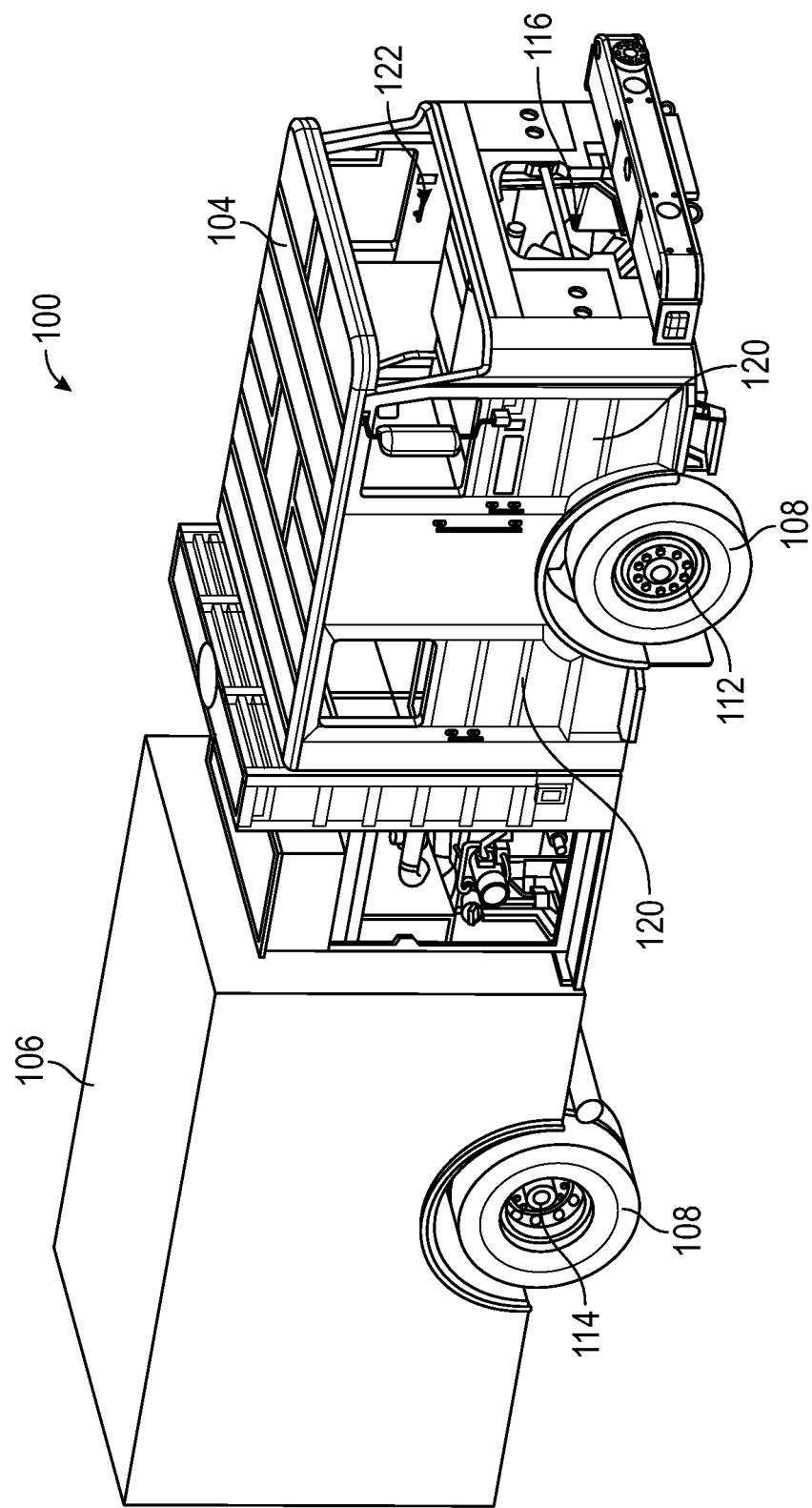
FIG. 2 is a front, right perspective view of the firefighting vehicle of FIG. 1, according to an exemplary embodiment.
Figure 3:
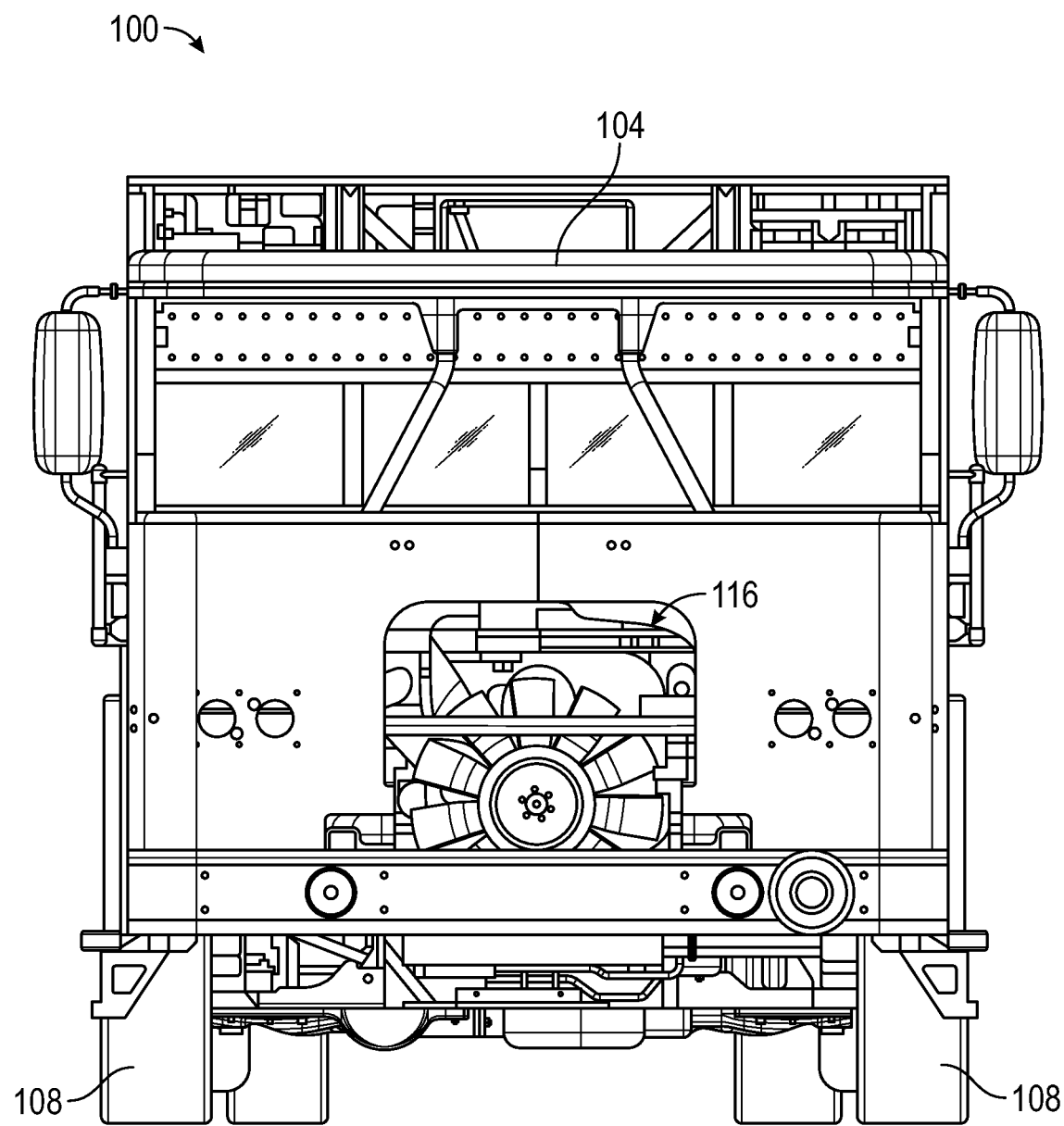
FIG. 3 is a front view of the firefighting vehicle of FIG. 1, according to an exemplary embodiment.
Figure 4:
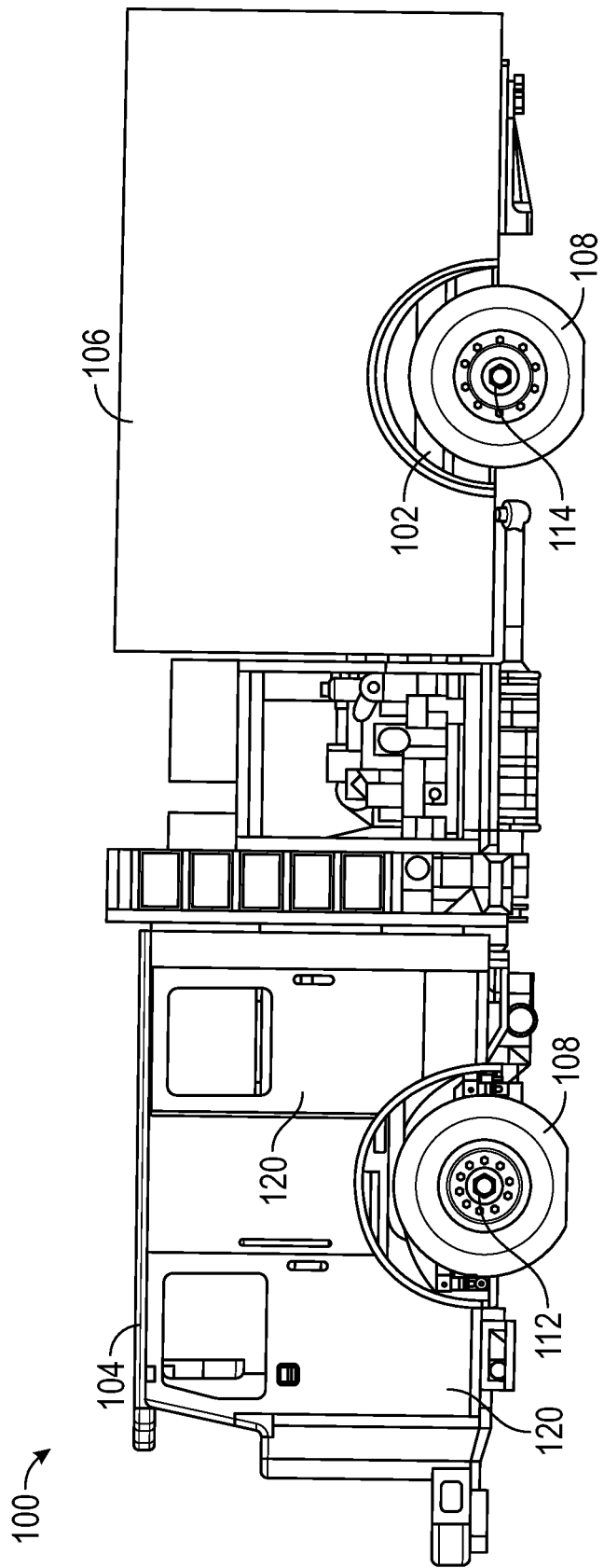
FIG. 4 is a left side view of the firefighting vehicle of FIG. 1, according to an exemplary embodiment.
Figure 5:
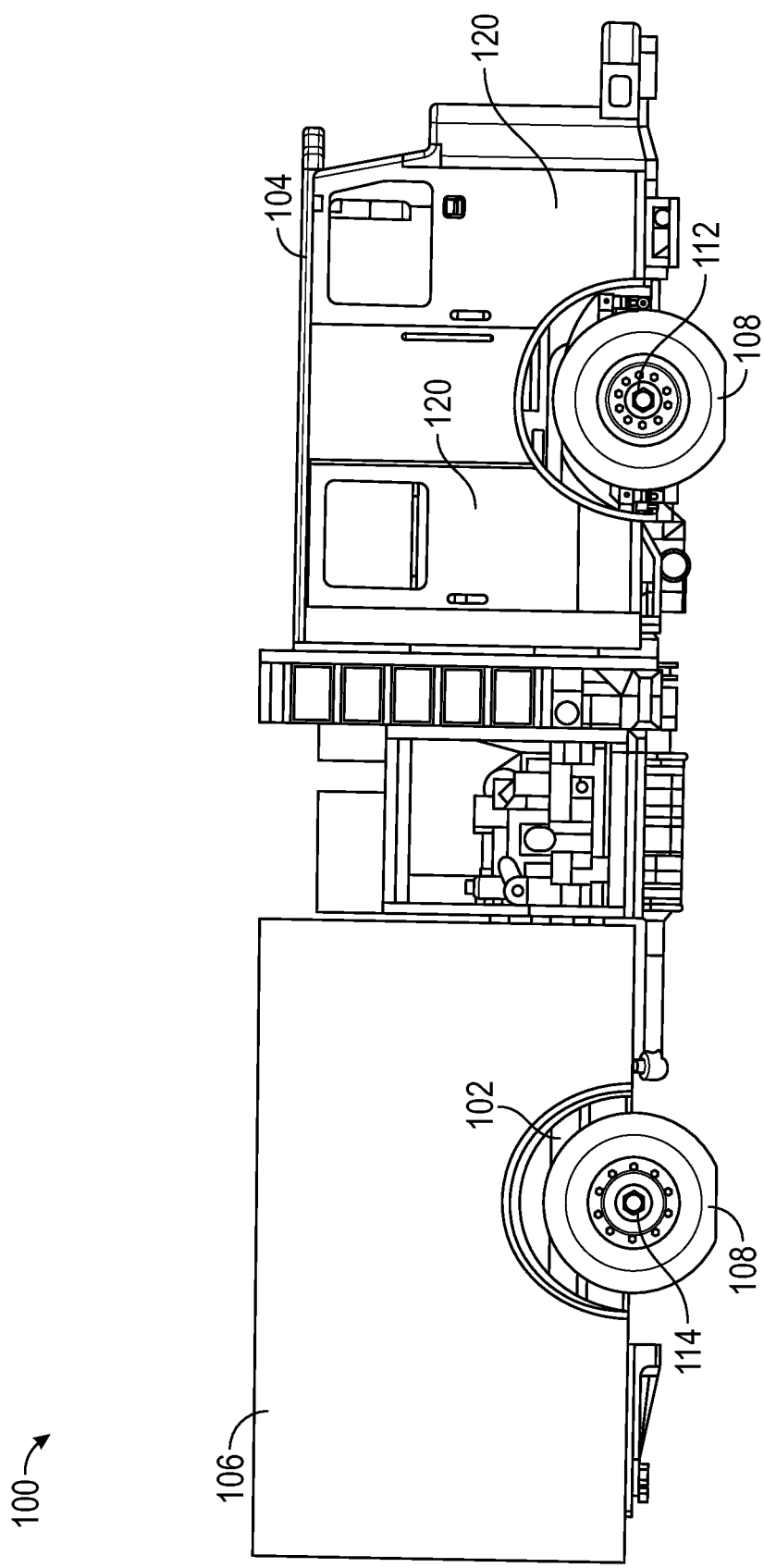
FIG. 5 is a right side view of the firefighting vehicle of FIG. 1, according to an exemplary embodiment.
Figure 6:
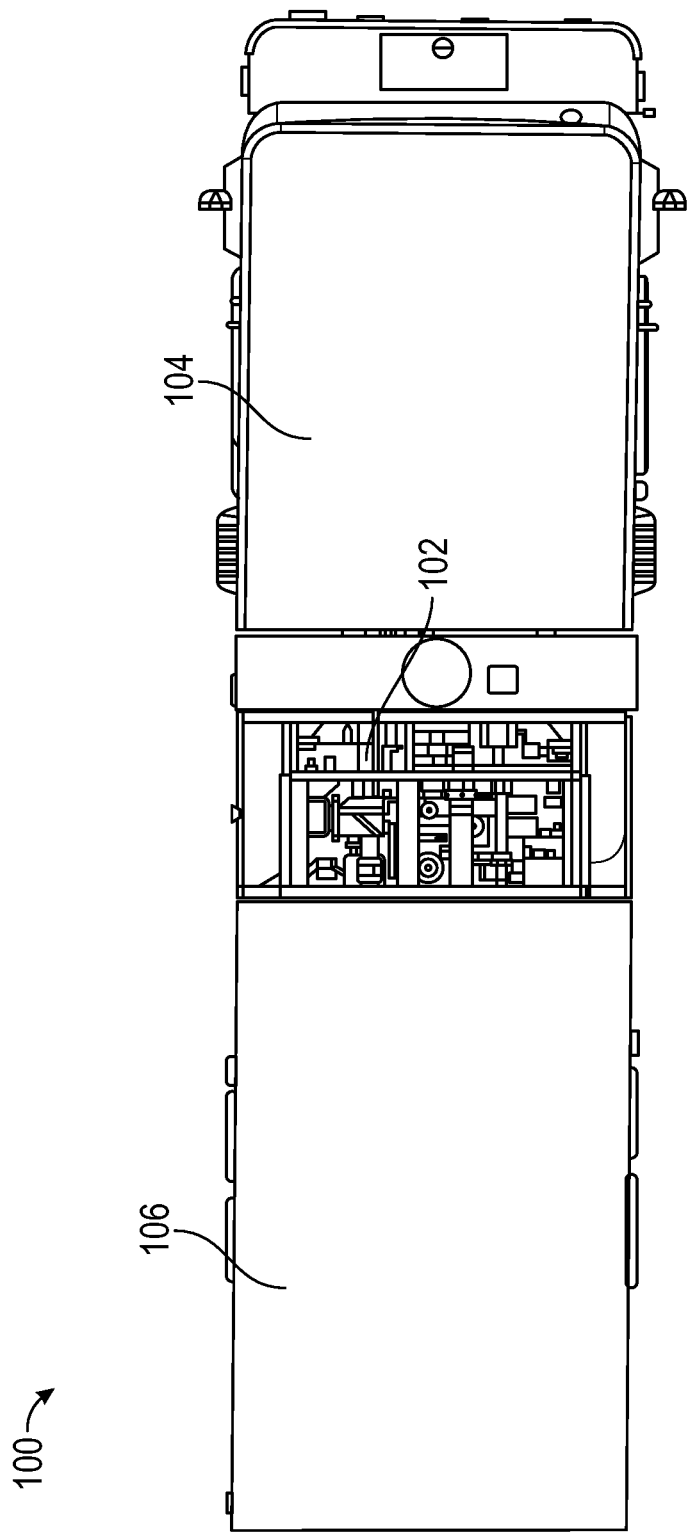
FIG. 6 is a top view of the firefighting vehicle of FIG. 1, according to an exemplary embodiment.

Before turning to the figures, which illustrate the exemplary embodiments in detail, it should be understood that the present application is not limited to the details or methodology set forth in the description or illustrated in the Figures. It should also be understood that the terminology is for the purpose of description only and should not be regarded as limiting.

According to an exemplary embodiment, a firefighting vehicle includes apparatuses for providing structural cab integrity. In an exemplary embodiment, the chassis and the cab include structural elements that are configured to interact to transfer and/or receive forces to provide the cab and other vehicle components structural integrity.

Referring generally to FIGS. 1-11, a vehicle or machine is shown according to an exemplary embodiment. While various vehicles are described herein, it should be understood that the present disclosure similarly applies to other types of vehicles. For example, the vehicle may be a firefighting vehicle (e.g., a pumper fire truck, an aerial ladder truck, etc.). The vehicle may be a front-loading refuse truck (e.g., a garbage truck, a waste collection truck, a sanitation truck, a recycling truck, etc.), a rear loading refuse truck, or a side loading refuse truck. The vehicle may be a rear-discharge concrete mixer truck or a front-discharge concrete mixer truck. The vehicle may also be a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle.

Referring now to FIGS. 1-6, a vehicle is shown as pumper fire truck 100, according to an exemplary embodiment. In some embodiments, the vehicle is an aerial ladder truck. The aerial ladder truck may include a rear-mount aerial ladder or a mid-mount aerial ladder. In other embodiments, the aerial ladder truck is a quint fire truck. In yet other embodiments, the aerial ladder truck is a tiller fire truck. In some embodiments, the firefighting vehicle is an airport rescue firefighting ("ARFF") truck. In various embodiments, the vehicle (e.g., a quint, a tanker, an ARFF, etc.) includes an on-board water storage tank, an on-board agent storage tank, and/or a pumping station. In other embodiments, the vehicle is still another type of firefighting vehicle. In yet other embodiments, the vehicle is another type of vehicle other than a firefighting vehicle. For example, the vehicle may be a refuse truck, a concrete mixer, a military vehicle, a tow truck, an ambulance, a farming machine, a construction machine, and/or still another vehicle.

As shown in FIGS. 1-6, the pumper fire truck 100 includes a chassis, shown as frame 102, a cab 104, a rear assembly 106, and a plurality of tractive elements, shown as wheels 108. According to an exemplary embodiment, the frame 102 includes a first frame member and a second frame member that are arranged in parallel. The first frame member and the second frame member may be elongated structural members (e.g., a beam, channel, tubing, extrusion, etc.), and may extend along a longitudinal direction (e.g., a forward and a backward direction) between a front end of the pumper fire truck 100 and a rear end of the pumper fire truck 100. In an exemplary embodiment, a centerline of the pumper fire truck 100 extends parallel to the longitudinal direction between the first frame member and the second frame member. The first frame member and the second frame member may be laterally spaced, and define a cavity or void therebetween. In this regard, the cavity may provide an area for effectively concealing or otherwise mounting certain components of the pumper fire truck 100. In some embodiments, the frame 102 includes and/or supports additional components utilized by a user during operation of the pumper fire truck 100. In an exemplary embodiment, the frame 102 supports other components of the pumper fire truck 100. For example, the frame 102 may support the cab 104 at a forward portion of the frame 102, and/or the rear assembly 106 at a rearward portion of the frame 102 (e.g., rearward relative to the cab 104). In other embodiments, the frame 102 supports the rear assembly 106 at a forward and/or middle portion of the frame 102, and the cab 104 at a rearward portion of the frame 102 (e.g., rearward of the rear assembly 106), for example in a rear tiller fire truck.

As shown in FIGS. 1-6, the chassis also includes a plurality of axles (e.g., shown as a front axle 112 and a rear axle 114) and a driveline 116. The front axle 112 and the rear axle 114 may be supported by the frame 102 and couple to the wheels 108. In this regard, the front axle 112 and the rear axle 114 may couple the wheels 108 to the frame 102, as discussed below.

According to an exemplary embodiment, the driveline 116 also includes a plurality of elements, for example a powertrain system, a drivetrain system, an accessory drive, etc. In an exemplary embodiment, the powertrain system includes a primary driver (e.g., an engine, motor, actuator, etc.), an energy generation device (e.g., a generator, etc.), and/or an energy storage device (e.g., a battery, capacitors, ultra-capacitors, etc.) electrically coupled to the energy generation device. The primary driver may receive one or more of a variety of fuels (e.g., gasoline, diesel, bio-diesel, ethanol, natural gas, etc.) from a fuel tank, and combust the fuel to generate mechanical energy. According to an exemplary embodiment, the primary driver is a compression-ignition internal combustion engine that utilizes diesel fuel. In other embodiments, the primary driver is another type of device (e.g., a spark-ignition engine, fuel cell, electric motor, etc.) that is otherwise powered (e.g., via gasoline, compressed natural gas, hydrogen, electricity, etc.).

According to an exemplary embodiment, a transmission may receive the mechanical energy from the primary driver, and provide an output to the generator. The generator may be configured to convert the mechanical energy into electrical energy, which may be stored by the energy storage device. In some embodiments, the transmission is rotatably coupled to the primary driver, a transfer assembly, and/or one or more drive shafts. The one or more drive shafts may be received by one or more differentials, which are configured to convey the rotational energy of the drive shaft to the final drive (e.g., half-shafts coupled to the plurality of wheels 108, the front axle 112, the rear axle 114, etc.). The final drive may then propel or move the vehicle (e.g., the pumper fire truck 100) forward.

In some embodiments, the pumper fire truck 100 is configured as an electric vehicle that is propelled by an electric powertrain system. The pumper fire truck 100 may include one or more energy storage devices (e.g., batteries, capacitors, etc.), which may be configured to provide electrical energy to one or more drive motors (e.g., motor, generator, actuator, motive driver, etc.). In an exemplary embodiment, the drive motor is coupled to one of the plurality of wheels 108, and is configured to receive electrical energy and/or drive the at least one of the plurality of wheels 108 (e.g., a front wheel, a rear wheel, both front wheels, both rear wheels, etc.). In other embodiments, each of the plurality of wheels 108 include an individual drive motor, so as to facilitate independent driving of each of the wheels 108. In yet other embodiments, the vehicle (e.g., the pumper fire truck 100) does not include the generator and/or the energy storage device. The powertrain may thereby be a hybrid powertrain or a non-hybrid powertrain.

As shown in FIGS. 1-6, the cab 104 includes a plurality of body panels coupled to a support (e.g., a structural frame assembly, etc.) and a plurality of doors 120. The body panels may define a plurality of openings through which an operator may access an interior, shown as an interior 122, of the cab 104 (e.g., for ingress, for egress, to retrieve components from within, etc.). According to an exemplary embodiment, the plurality of doors 120 are positioned over the plurality of openings defined by the plurality of body panels. The plurality of doors 120 may provide access to the interior 122 of the cab 104 for a driver and/or passengers of the pumper fire truck 100. The plurality of doors 120 may be hinged, sliding, bus-style folding doors, or any other suitable type of door.

In other embodiments, the cab 104 includes other components that are arranged in various configurations. For example, the configurations may vary based on the particular application of the vehicle, customer requirements, or other factors. The cab 104 may be configured to contain and/or otherwise support any number of occupants, storage units, and/or equipment. For example, the cab 104 may provide seating for an operator (e.g., a driver, etc.) and/or one or more passengers. The cab 104 may also include one or more storage areas for providing compartmental storage for various articles (e.g., supplies, instrumentation, equipment, etc.). In an exemplary embodiment, the interior 122 of the cab 104 further includes a user interface. The user interface may include a cabin display and various controls (e.g., buttons, switches, knobs, levers, joysticks, etc.). In some embodiments, the user interface includes touchscreens, a steering wheel, an accelerator pedal, and/or a brake pedal, among other components. The user interface may be configured to provide the operator with control over the vehicle (e.g., direction, speed, travel, etc.), one or more components of the driveline 116, and/or other components of the pumper fire truck 100 from within the cab 104.

As shown in FIGS. 1-6, the rear assembly 106 includes a plurality of compartments with corresponding doors positioned along one or more sides (e.g., left side, right side, etc.) and/or at a rear portion of the rear assembly 106. The plurality of compartments may facilitate storing various equipment. For example, the plurality of compartments may store oxygen tanks, hoses, axes, extinguishers, ladders, chains, ropes, straps, boots, jackets, blankets, first-aid kits, and/or still other equipment. One or more of the plurality of compartments may include various storage apparatuses (e.g., shelving hooks, racks, etc.) for storing and/or organizing the equipment.

In some embodiments (e.g., when the vehicle is an aerial ladder truck, etc.) the rear assembly 106 includes an aerial ladder assembly. The aerial ladder assembly may have a fixed length, or have one or more extendable ladder sections. The aerial ladder assembly may include a basket or implement (e.g., a water turret, etc.) coupled to a distal end or free end of the ladder assembly (e.g., ladder section, ladder sections, etc.). The aerial ladder assembly may be positioned proximate a rear portion of the rear assembly 106 (e.g., a rear-mount fire truck, etc.), or proximate a front portion of the rear assembly 106 (e.g., a mid-mount fire truck, etc.).

In some embodiments (e.g., when the vehicle is an ARFF truck, a tanker truck, a quint truck, etc.), the rear assembly 106 includes one or more fluid tanks. By way of example, the one or more fluid tanks may include a water tank and/or an agent tank. The water tank and/or the agent tank may be corrosion and UV resistant polypropylene tanks. In an exemplary embodiment (e.g., a municipal fire truck implementation, a non-ARFF truck implementation, etc.), the water tank has a maximum water capacity ranging between 50 and 1,000 gallons (e.g., 50, 100, 150, 200, 250, 300, 350, 400, 450, 500, 550, 600, 650, 700, 750, 800, 850, 900, 950, 1,000, etc. gallons). In other embodiments (e.g., an ARFF truck implementation), the water tank has a maximum water capacity ranging between 1,000 and 4,500 gallons (e.g., at least 1,250 gallons; between 2,500 gallons and 3,500 gallons; at most 4,500 gallons; at most 3,000 gallons; at most 1,500 gallons; etc.). In some embodiments, the capacity of the water tank and/or the agent tank is specified by the customer. In this regard, it should be understood that the water tank and/or the agent tank configurations are highly customizable, and the scope of the present disclosure is not limited to a particular size or configuration of the water tank and/or the agent tank. According to an exemplary embodiment, the agent is a foam fire suppressant (e.g., an aqueous film forming foam ("FFFP"), etc.). In other embodiments, the agent is a low-expansion foam, a medium-expansion foam, a high-expansion foam, an alcohol-resistant foam, a synthetic foam, a protein-based foams, a fluorine-free foam, a film-forming fluoro protein ("FFFP") foam, an alcohol resistant aqueous film forming foam ("AR-AFFF"), and/or any other suitable foam, or a foam yet to be developed.

As shown in FIGS. 1-6, the pumper fire truck 100 also includes the plurality of wheels 108. In an exemplary embodiment, the plurality of wheels 108 includes brakes (e.g., disc brakes, drum brakes, air brakes, etc.), gear reductions, steering components, wheel hubs, wheels, tires, and/or other features. In an exemplary embodiment, the plurality of wheels 108 are coupled to the front axle 112 and the rear axle 114. While the pumper fire truck 100 is shown as including single wheel axle sets, it should be understood that the pumper fire truck 100 may include a plurality of wheels 108 that have any number of suitable wheel configurations. For example, the pumper fire truck may include single axle sets, dual axel sets, triple axel sets, with four, eight, eighteen, or any other suitable number of wheels. It should also be understood that in some embodiments, at least one of the front and/or rear assemblies of the plurality of wheels 108 include a different type of tractive element (e.g., a track, etc.).

Figure 7:
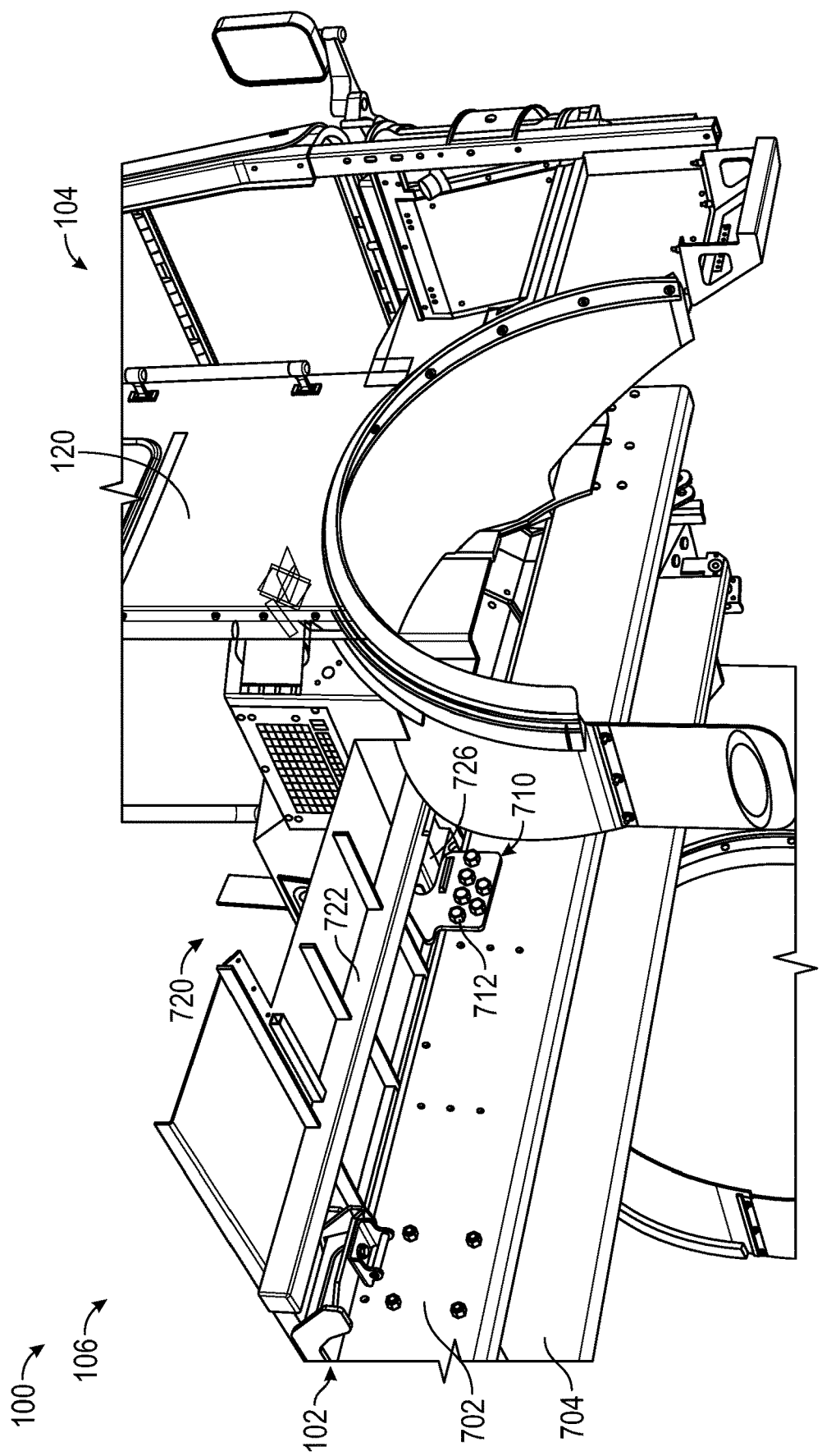
FIG. 7 is a right side perspective view of a portion of the firefighting vehicle of FIG. 1, according to an exemplary embodiment.

Referring now to FIGS. 7-11, views of a vehicle are shown, according to an exemplary embodiment. In an exemplary embodiment, the vehicle is the pumper fire truck 100 of FIGS. 1-6. However, in other embodiments, the vehicle is any other suitable vehicle, as discussed above. As shown in FIG. 7, the pumper fire truck 100 includes the frame 102, the cab 104, and the rear assembly 106.

As shown in FIGS. 7-11, the frame 102 includes a plurality of frame members, shown as a first frame member 702 and a second frame member 704. In an exemplary embodiment, the frame members 702, 704 are longitudinally extending frame members (e.g., extend between a front end of the pumper fire truck 100 and a rear end of the pumper fire truck 100). As discussed above, the frame members 702, 704 may define a centerline of the pumper fire truck 100, which may (run parallel and) be between the first frame member 702 and the second frame member 704. The plurality of frame members 702, 704 may have a C-shaped cross-section, including a base section and two leg sections that are substantially perpendicular to the base section. In an exemplary embodiment, components of the pumper fire truck 100 are coupled to the frame members 702, 704, either directly or through another component (e.g., a side plate, a mounting bracket, etc.). As shown in FIG. 7, the frame 102 (e.g., the first frame member 702, the second frame member 704, etc.) supports the cab 104 at a forward portion of the frame 102, and (components of) the rear assembly 106 at a rearward portion of the frame 102 (e.g., rearward of the cab 104). In other embodiments, the plurality of frame members 702, 704 are other suitable elongated structural members (e.g., a beam, channel, tubing, extrusion, etc.) of any suitable cross-sectional shape (e.g., H-profile, I-profile, U-profile, L-profile, square, rectangular, etc. having a top section, a base section, a bottom section, etc.).

As shown in FIGS. 7-11, the pumper fire truck 100 also includes a receiver, shown as catch 710. In an exemplary embodiment, the catch 710 is coupled to a forward portion of the frame 102 proximate to the cab 104, and is configured to engage (e.g., catch, receive, stop, contact, couple, etc.) a component of the cab 104 (e.g., a cross-member, a block, a pin, etc.). In an exemplary embodiment, the catch 710 is a metal hook having an engagement surface (e.g., a sloped, curved, bite, receiving, etc. surface configured to engage a structural member), and is coupled to the frame 102 (e.g., the first frame member 702, etc.) via a plurality of catch bolts 712. In other embodiments, the catch 710 is positioned at another suitable location at the frame 102, and/or is another suitable receiver formed any suitable material (e.g., a metal block, a steel cheek plate, a machined slab, a machined cube, a peg, a pin, etc.). In yet other embodiments, the catch 710 is coupled to the frame 102 via another configuration (e.g., welded to the frame 102, fabricated/machined as a component of the frame 102, etc.).

According to an exemplary embodiment, the pumper fire truck 100 includes a plurality of catches 710 (e.g., a first catch 710 on the first frame member 702, a second catch 710 on the second frame member 704, a third catch 710 on a third frame member, etc.). In an exemplary embodiment, the catches 710 are coupled to a forward portion of the frame 102, and are separated by a distance laterally (e.g., coupled to the first frame member 702 and the second frame member 704, which are separated by a distance laterally). According to an exemplary embodiment, the plurality of catches 710 are coupled to the frame 102 and substantially aligned (e.g., a first catch 710 coupled to the first frame member 702 is substantially aligned with the second catch 710 coupled to the second frame member 704, etc.); however, in other embodiments the plurality of catches 710 are in another suitable configuration (e.g., angled, offset, on the same frame member, etc. relative to one another).

As shown in FIGS. 7-11, and as discussed above, the cab 104 includes a plurality of body panels and a plurality of doors 120. The cab 104 also includes a cab frame 720, having a first cab frame member 722 and a second cab frame member 724. In an exemplary embodiment, the cab frame members 722, 724 are longitudinally extending frame members (e.g., extend between a front end of the cab 104 and a rear end of the cab 104). The cab frame members 722, 724 may have a C-shaped cross-section, including a cab frame base section and two cab frame leg sections that are substantially perpendicular to the base section. According to an exemplary embodiment, components of the cab 104 are coupled to the first cab frame member 722 and/or the second cab frame member 724, either directly or via another component (e.g., a side plate, a mounting bracket, a cab frame extension, etc.). In other embodiments, the cab frame members 722, 724 are other suitable elongated structural members (e.g., a beam, channel, tubing, extrusion, etc.), and/or have other suitable cross-sectional shapes (e.g., H-profile, I-profile, U-profile, L-profile, square, rectangular, etc.).

As shown in FIGS. 7-11, the cab 104 also includes a cab cross-member 726 and a plurality of engine tunnel side-plates, shown as side-plates 728. In an exemplary embodiment, the cab cross-member 726 is a laterally extending cross-member, and is configured to support components of the cab 104 and/or engage components of the chassis (e.g., frame 102, the catch 710, etc.). As shown in FIGS. 7-11, and as discussed in greater detail below, the cab cross-member 726 is positioned at a rearward (or middle) portion of the cab 104, and at a forward (or middle) portion of the frame 102 (e.g., forward relative to the catch 710). According to an exemplary embodiment, the cab cross-member 726 is a hollow elongated structural member (e.g., a tube, etc.), and is coupled to (and extends laterally between) the cab frame members 722, 724. In an exemplary embodiment, the cab cross-member 726 is coupled to the cab frame 720 via a plurality of bolts (e.g., cab cross-member bolts, etc.); however, in some embodiments the cab cross-member 726 is coupled to the cab frame 720 via another configuration (e.g., welded to the cab frame 720, machined/fabricated as a component of the cab frame 720, etc.). In some embodiments, the cab cross-member 726 is also coupled to other components of the cab 104 (e.g., the side-plates 728, side plates, mounting brackets, frame extensions, etc.). In other embodiments, the cab cross-member 726 is another suitable elongated structural member (e.g., a beam, a channel, an extrusion, etc.). In yet other embodiments, the cab cross-member 726 is not an elongated structural member; rather, the cab cross-member 726 is another suitable stop coupled to the cab 104 (e.g., a metal hook, a metal loop, a metal block, a cheek plate, a machined slab, a machined cube, a peg, etc.).

According to an exemplary embodiment, the cab 104 is rotatably coupled to the frame 102 (e.g., the first frame member 702, the second frame member 704, etc.), and is configured to rotate about a lateral axis and/or move relative to the frame 102 (e.g., tilt backward, tilt upward, and/or shift rearward, etc.). In this regard, the cab 104 may be configured to rotate and/or be move between a standard use position (e.g., the cab 104 is horizontal and/or substantially parallel to the frame 102, etc.) and an impact position (e.g., the cab 104 is rotated about a lateral axis, the cab 104 is shifted rearward relative to the frame 102, etc.). In other embodiments, the cab 104 (e.g., the cab frame 720, etc.) is also rotatably coupled to a forward portion of the frame 102 via a pivot mount and/or an actuator assembly. In this regard, the cab 104 may be configured to rotate between a standard use position (e.g., the cab 104 is horizontal and/or substantially parallel to the frame 102, etc.) and a maintenance position (e.g., the cab 104 is rotated upward relative to the frame 102, etc.). In an exemplary embodiment, the pivot mount includes a plurality of elements (e.g., a boss, a bracket, a side plate, a top plate, bracings, isolators, a pivot pin, a retaining pin, fasteners, etc.) that facilitate the cab 104 coupling to the frame 102. Similarly, in an exemplary embodiment, the actuator assembly includes a plurality of elements (e.g., a hydraulic cylinder, a cylinder body, a rod, valves, pumps, reservoirs, electronic components, pneumatic components, etc.) that facilitate the cab 104 rotating between a standard use position and a maintenance position.

Figure 8:
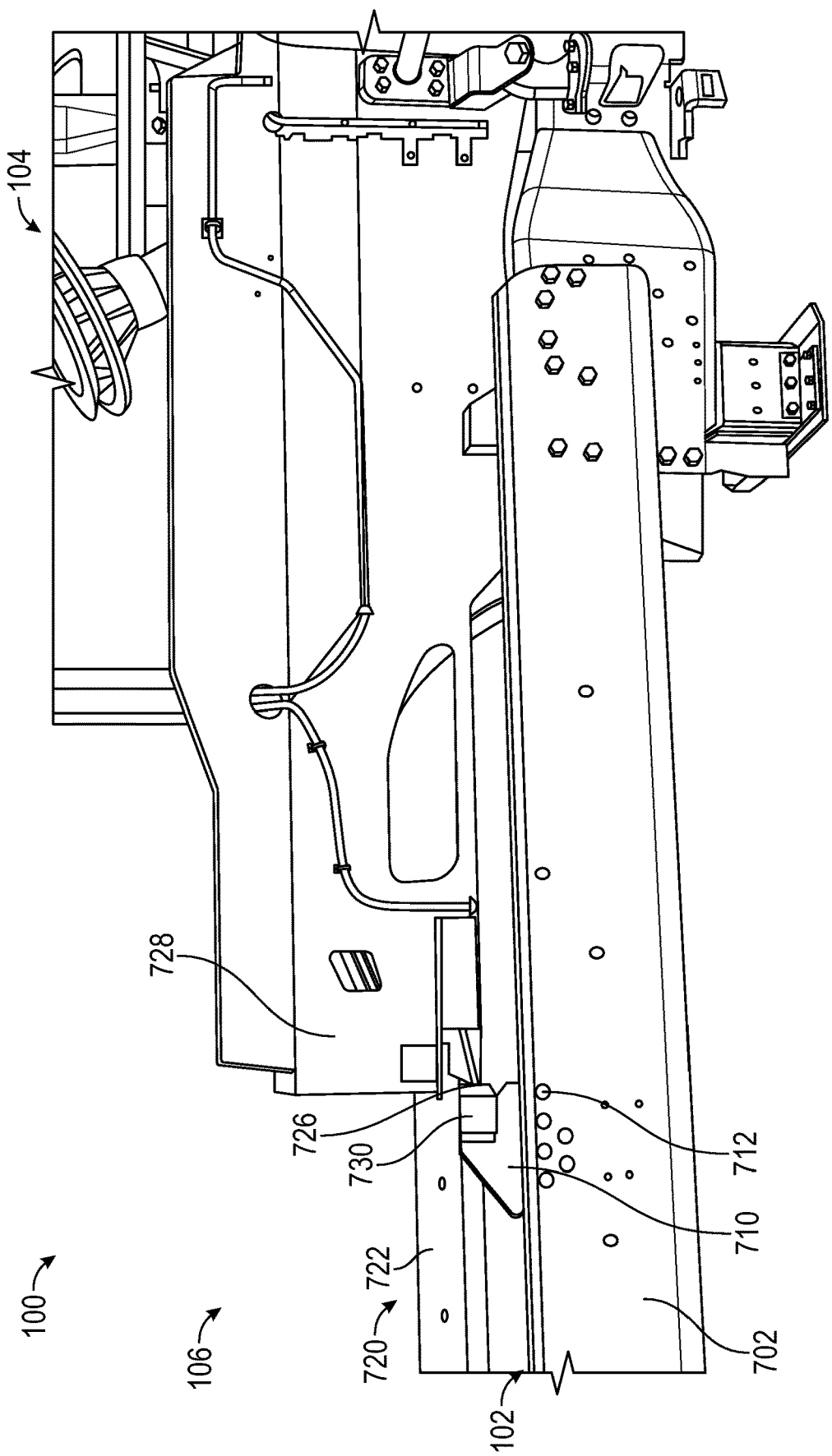
FIG. 8 is a right side perspective view of a portion of the firefighting vehicle of FIG. 1, according to an exemplary embodiment.

Referring now to FIG. 8, a view of a right side of a vehicle is shown, according to an exemplary embodiment. In an exemplary embodiment, the vehicle is the pumper fire truck 100 of FIG. 7. As shown in FIG. 8, the cab 104 also includes the side-plate 728 and a pin 730. According to an exemplary embodiment, the side-plate 728 (or a plurality of side-plates 728) is a longitudinally extending plate (e.g., extends between a front end of the cab 104 and a rear end of the cab 104). In an exemplary embodiment, the side-plate 728 is coupled to the cab frame 720 (e.g., the first cab frame member 722, the second cab frame member 724, etc.) via a suitable configuration (e.g., via bolts, welding, machining, etc.). In some embodiments, the side-plate 728 also couples the cab cross-member 726, the pin 730, and/or other components of the cab 104 etc. The side-plate 728 (or the plurality of side-plates 728) may also be configured to house other components of the pumper fire truck 100, for example components of a powertrain system (e.g., a primary driver, engine, motor, generator, energy storage device, etc.), a drivetrain system (e.g., an engine, transmission, etc.), and/or an accessory drive, etc.

As shown in FIG. 8, the pin 730 is an elongated structural member (e.g., an elongated block, a beam, channel, tubing, extrusion, etc.), and is configured to couple (e.g., slide into, engage with, etc.) the cab cross-member 726 and/or engage components of the chassis (e.g., the frame 102, the catch 710, etc.). In an exemplary embodiment (shown in FIGS. 10-11), the pin 730 is also configured to couple other components of the cab 104, for example the cab frame members 722, 724, the side-plate 728, etc., either directly or via another component (e.g., a side plate, a mounting bracket, a cab frame extension, etc.). In this regard, the pin 730 may be configured to couple (e.g., slide into) the cab cross-member 726, couple the first cab frame member 722, and engage (e.g., contact, etc.) the catch 710, as discussed below. According to an exemplary embodiment, the pin 730 and the cab cross-member 726 are separate components; however, in some embodiments the cab cross-member 726 and the pin 730 are a unified component. In other embodiments, the pin 730 is not an elongated structural member; rather, the pin 730 is any suitable structural stop coupled to components of the cab 104 (e.g., a metal hook, a metal loop, a metal block, a cheek plate, a machined slab, a machined cube, a peg, etc.).

As shown in FIG. 8, and as discussed briefly above, the catch 710 is coupled (e.g., bolted via the plurality of catch bolts 712, etc.) to the frame 102 (e.g., the first frame member 702). In an exemplary embodiment, the catch 710 is positioned at a forward portion of the frame 102, and is rearward relative to components of the cab 104 (e.g., rearward relative to the cab cross-member 726 and/or the pin 730). The cab cross-member 726 and/or the pin 730 may be coupled (e.g., bolted via a plurality of cab cross-member bolts, etc.) to the cab frame 720 (e.g., the first cab frame member 722, the second cab frame member 724, etc.) and/or other components of the cab 104 (e.g., the side-plate 728, etc.). In an exemplary embodiment, the cab cross-member 726 and/or the pin 730 is positioned at a rearward (or middle) portion of the cab frame 720, and is forward relative to components of the frame 102 (e.g., forward relative to the catch 710). As shown in FIG. 8, the cab cross-member 726 (and/or the pin 730) may be positioned any suitable distance forward relative to the catch 710. For example, the cab cross-member 726/the pin 730 is/are positioned 0.75 inches forward relative to the catch 710. In some embodiments, the cab cross-member 726/the pin 730 is/are positioned 0.25, 0.5, 1, 1.25, 1.5 inches, or any other suitable distance, forward relative to the catch 710. In other embodiments, the cab cross-member 726/the pin 730 is/are in contact with (e.g., 0 inches from) the catch 710. In yet other embodiments, the cab cross-member 726/the pin 730 may be configured not to extend beyond a threshold distance forward (e.g., 2, 2.5, 5, etc. inches) relative to the catch 710.

Figure 9:
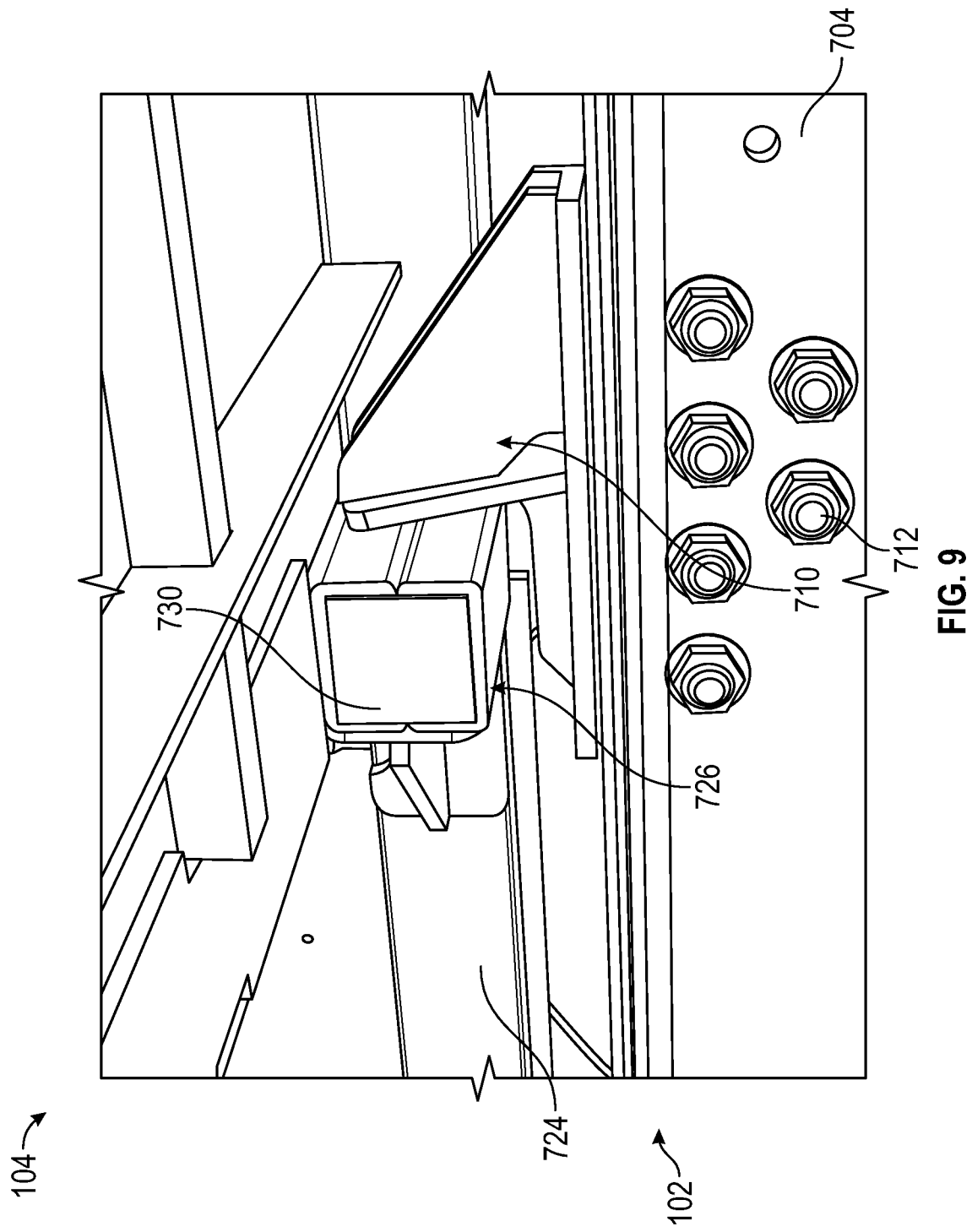
FIG. 9 is a left side perspective view of a portion of the firefighting vehicle of FIG. 1, according to an exemplary embodiment.

Referring now to FIG. 9, a view of a left side of a vehicle is shown, according to an exemplary embodiment. In an exemplary embodiment, the vehicle is the pumper fire truck 100 of FIG. 7. As shown in FIG. 9, the catch 710 is coupled (e.g., bolted via the plurality of catch bolts 712, etc.) to the frame 102 (e.g., the second frame member 704), and positioned at a forward portion of the frame 102 and rearward relative to components of the cab 104 (e.g., rearward relative to the cab cross-member 726 and/or the pin 730). The cab cross-member 726 (and/or pin 730) may be coupled to the cab frame 720 (e.g., the second cab frame member 724, the side-plate 728, etc.), and may be positioned at a rearward (or middle) portion of the cab 104 and forward relative to components of the frame 102 (e.g., forward relative to the catch 710). As was discussed above in FIG. 8, the cab cross-member 726 (and/or the pin 730) may be configured to be positioned any suitable distance forward relative to the catch 710 (e.g., 0.25, 0.5, 0.75, 1, 1.25, 1.5, 2, 2.5, 5, etc. inches).

As shown in FIG. 9, the catch 710 is coupled to the frame 102 (e.g., via a plurality of catch bolts 712) and is positioned rearward relative to the cab cross-member 726 and/or the pin 730. In an exemplary embodiment, the catch 710 is coupled to a top section and/or a side section of the frame 102 (e.g., a top section and/or a side section of the second frame member 704). As shown in FIG. 9, the catch 710 includes an engagement surface (e.g., a sloped surface that faces forward and downward, etc.), which is configured to engage a structural component. For example, the engagement surface of the catch 710 may engage (e.g., contact, receive, stop, etc.) the cab cross-member 726 and/or the pin 730, so as to reposition the cab cross-member 726 and/or the pin 730 relative to the frame 102 (e.g., push against a top section of the frame 102, etc.), as discussed below. In some embodiments, the catch 710 is coupled to other sections of the frame 102 (e.g., a bottom section, a side section, etc.) and/or is otherwise oriented relative to the cab cross-member 726 and/or the pin 730 (e.g., forward, below, above, etc.). In yet other embodiments, the catch 710 includes additional, fewer, and/or different working components (e.g., an engagement surface that is sloped forward and upward, rearward and downward, rearward and upward, a curved, bite, receiving, etc. surface, etc.).

Figure 10:
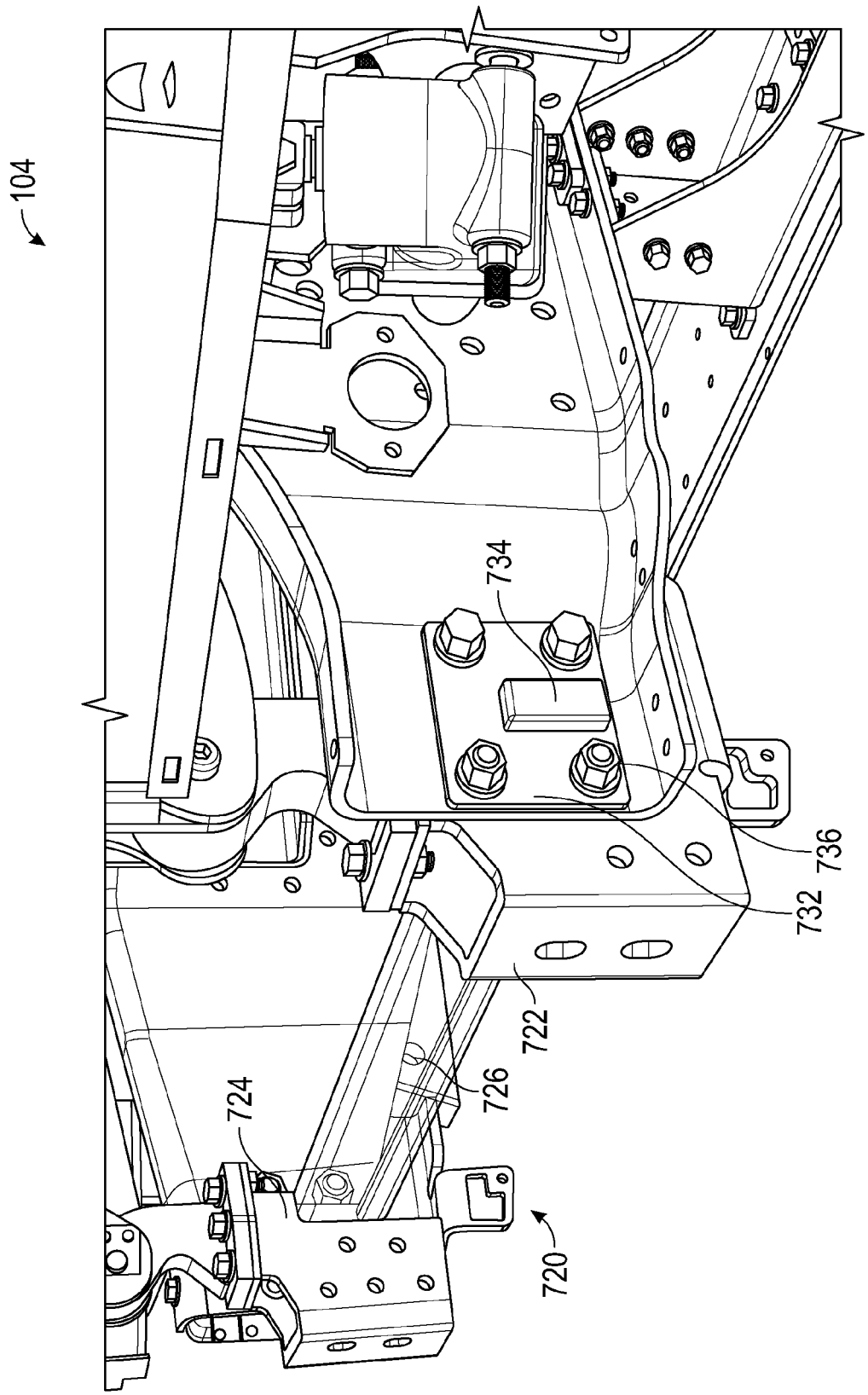
FIG. 10 is a right side perspective view of a portion of the firefighting vehicle of FIG. 1, according to an exemplary embodiment.

Referring now to FIG. 10, a view of a right side of a vehicle is shown, according to an exemplary embodiment. In an exemplary embodiment, the vehicle is the pumper fire truck 100 of FIG. 7. As shown in FIG. 10, the cab 104 also includes a pin bracket 732 (having a pin receiving area 734) and a plurality of pin bolts 736. In an exemplary embodiment, the pin bracket 732 is substantially flat, and is configured to couple the cab frame 720 (e.g., the first cab frame member 722, the second cab frame member 724, etc.), the cab cross-member 726, and/or the pin 730. The pin bracket 732 may be positioned at a rearward (or middle) portion of the cab 104, and may align with the cab cross-member 726 and/or the pin 730. In an exemplary embodiment, the pin bracket 732 is coupled to the cab frame 720 (and/or the cab cross-member 726, the pin 730, etc.) via the plurality of pin bolts 736. However, in other embodiments, the pin bracket 732 is coupled to the cab frame 720 (and/or the cab cross-member 726, the pin 730, etc.) via another suitable configuration (e.g., welded, machined, fabricated as a component of the cab frame 720, etc.). According to an exemplary embodiment, the pin receiving area 734 is a small protrusion, and is configured to engage (e.g., couple, receive, support, hold, etc.) the pin 730 at an interior recess of the pin receiving area 734. In other embodiments, the pin receiving area 734 is not a small protrusion; rather, is any other suitable receiving surface (e.g., ridged, textured, an extrusion, etc.) and/or is configured to engage (e.g., couple, receive, support, hold, etc.) the pin 730 (and/or the cab cross-member 726) at an interior portion of the pin bracket 732.

As discussed above, in an exemplary embodiment the pin 730 is configured to couple (e.g., slide into, engage with, etc.) the cab cross-member 726. In this regard, when the pin 730 is coupled to the cab cross-member 726 (e.g., slid into), the pin bracket 732 may couple to the cab frame 720 (e.g., a base section the first cab frame member 722, etc.), and the pin receiving area 734 may engage the pin 730. The pin bracket 732 may then be coupled to the cab frame 720 (e.g., the base section of the first cab frame member 722, etc.), for example using the plurality of pin bolts 736, and the pin bracket 732 may hold (e.g., support, retain, contain, etc.) the cab cross-member 726 and/or the pin 730 in position.

In some embodiments, the cab 104 includes a plurality of pin brackets 732. In other embodiments, the pin bracket 732 is positioned at another area of the cab 104, and/or is configured to couple with other components of the cab 104 (e.g., the first cab frame member 722, the second cab frame member 724, both the cab frame 720 members, the side-plate 728, etc.). In yet other embodiments, the pin bracket 732 is coupled to the cab frame 720 and/or other components of the cab 104 (e.g., the side-plate 728, etc.) through another component (e.g., a side plate, a mounting, a bracket, a cab frame extension, etc.). As discussed above, in some embodiments the cab cross-member 726 and/or the pin 730 are not elongated members; rather, the cab cross-member 726 and/or the pin 730 are another suitable structural stop (e.g., a metal hook, a metal loop, a metal block, a cheek plate, a machined slab, a machined cube, a peg, etc.). In this regard, in other embodiments the pin bracket 732 is positioned at other areas of the cab 104 (e.g., an interior portion of the base section of the cab frame 720, etc.), and/or is configured to couple the structural stop to other components of the cab 104 (e.g., the cab frame 720, the first cab frame member 722, the second cab frame member 724, and/or the side-plate 728, etc.).

Figure 11:
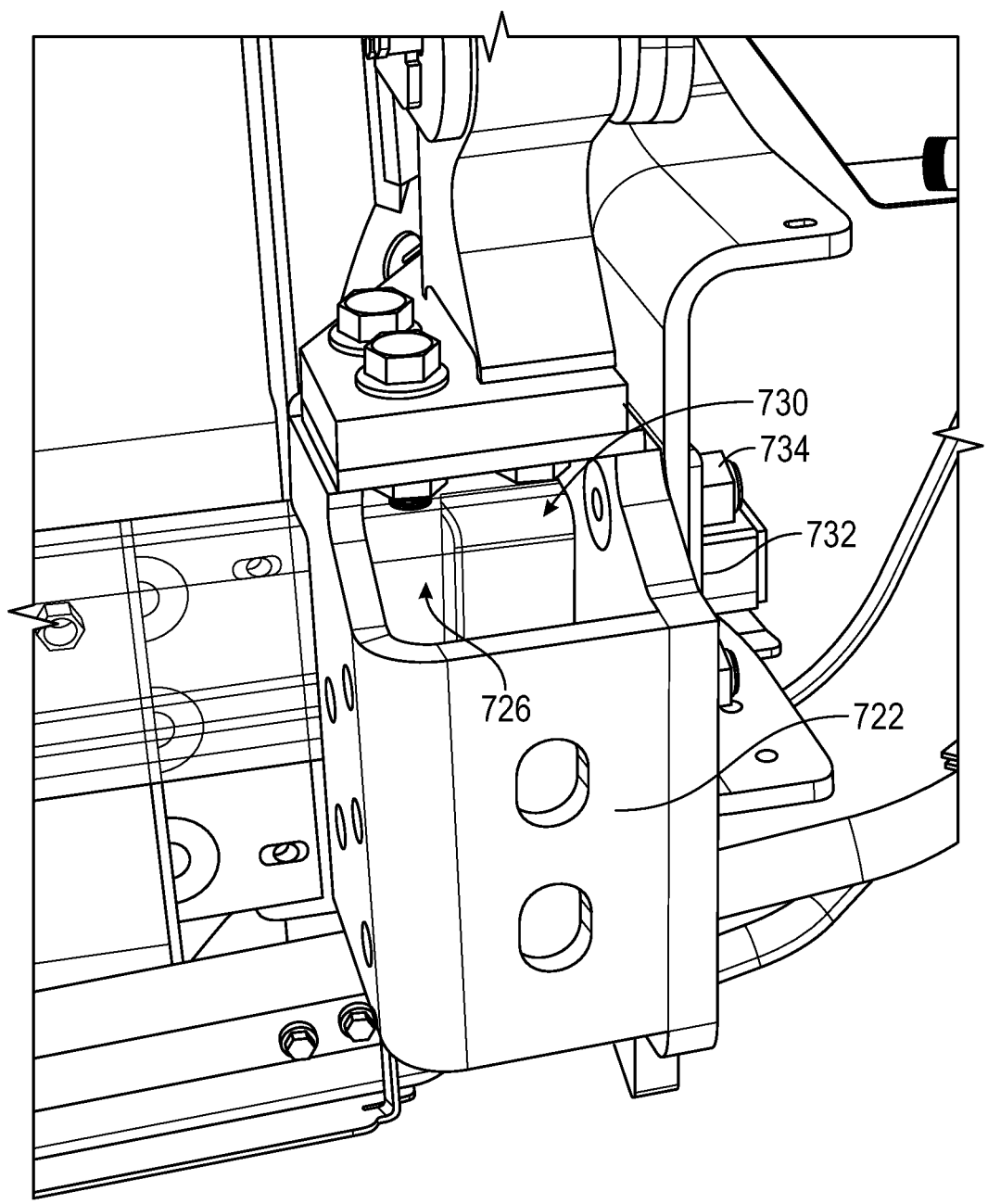
FIG. 11 is a rear perspective view of a portion of the firefighting vehicle of FIG. 1, according to an exemplary embodiment.

Referring now to FIG. 11, a rear view of a vehicle is shown, according to an exemplary embodiment. In an exemplary embodiment, the vehicle is the pumper fire truck 100 of FIG. 7. As shown in FIG. 11, and as discussed above, in an exemplary embodiment the pin 730 is configured to couple (e.g., slide into, engage with, etc.) the cab cross-member 726. When the pin 730 is coupled (e.g., slid into, etc.) the cab cross-member 726, the pin bracket 732 is coupled to the cab frame 720 (e.g., the first cab frame member 722, etc.) via the plurality of pin bolts 736, and the pin receiving area 734 engages the pin 730. According to an exemplary embodiment, when the pin brackets 732 (and the pin receiving area 734, the plurality of pin bolts 736, etc.) are coupled to the cab frame 720 (e.g., the first cab frame member 722) and other components of the cab 104 (e.g., the second cab frame member 724, the side-plate 728, etc.), the pin 730 (and/or the cab cross-member 726) may be held in position.

As an illustrative example, a cab integrity system may be prepared using the components described in FIGS. 1-11. As discussed above, in an exemplary embodiment the pumper fire truck 100 includes the frame 102 (having the first frame member 702 and the second frame member 704), the cab 104, and the rear assembly 106. The pumper fire truck 100 may further include the catch 710, which may be a receiver having an engagement surface (e.g. slopped surface, etc.) and/or any other suitable receiver (e.g., a block, a cheek plate, a slab, a cube, a peg, or any other suitable structural brace, etc.). Further, in an exemplary embodiment the cab 104 further includes the cab frame 720 (having the first cab frame member 722 and the second cab frame member 724), the cab cross-member 726, the pin 730, and the pin bracket 732.

According to an exemplary embodiment, the catch 710 is coupled (e.g., bolted, welded, machined, etc.) to the frame 102 (e.g., the first frame member 702) at a forward (and/or middle) portion of the frame 102. In an exemplary embodiment, the cab cross-member 726 is coupled to the pin 730 (e.g., the pin 730 is slid into the cab cross-member 726), and then the pin bracket 732 is coupled to the cab frame 720 (e.g., the first cab frame member 722 and/or the second cab frame member 724), the pin 730, and the cab cross-member 726. According to an exemplary embodiment, the pin bracket 732 is configured to align the cab cross-member 726 and the pin 730, and/or couple the cab cross-member 726 and/or the pin 730 to the cab frame 720 at a rearward (and/or middle) portion of the cab 104. In some embodiments, the cab cross-member 726 and/or the pin bracket 732 is/are also coupled to other components of the cab 104, for example the side-plate 728. According to an exemplary embodiment, the cab cross-member 726 and/or the pin 730 are oriented/positioned forward relative to the catch 710 (i.e., the catch 710 is positioned rearward on the frame 102 relative to the cab cross-member 726 and/or the pin 730).

According to an exemplary embodiment, the pumper fire truck 100 may encounter a force (e.g., an impact, load, accident, etc. at the cab 104). For example, the cab 104 may encounter a substantially horizontal force at the front of the cab 104 above the cab frame 720, a substantially horizontal force at a side of the cab 104, a substantially vertical force down on the top of the cab 104, and/or any other force at another location at the cab 104 (e.g., a front portion, front mid-portion, front lower-portion, near the headlights, near the bumper, etc.). According to an exemplary embodiment, when the cab 104 encounters a force, the cab 104 is configured to rotate about a lateral axis and/or reposition relative to the frame 102 (e.g., tilt backward, tilt upward, shift rearward, etc.). In this regard, a force may be initially received by components at the front of the cab 104 (e.g., the side-plate 728, a front bumper, a grill, etc.), and then transferred to other components at the rear (or middle) of the cab 104 (e.g., the cab cross-member 726, the pin 730).

According to an exemplary embodiment, the pin 730 and/or the cab cross-member 726 is/are positioned at the rear (or middle) of the cab 104, and may be configured to receive a force (or a portion thereof) as the cab 104 rotates and/or is repositioned (e.g., shifts rearward, etc.). Further, in an exemplary embodiment the pin 730 is configured to engage (e.g., contact, hit, etc.) components of the chassis (e.g., the frame 102, the catch 710, etc.) in response to the cab 104 being rotated and/or repositioned relative to the frame 102. For example, the pin 730 may be configured to engage the catch 710, which may be coupled to components of the chassis (e.g., the frame 102). In this regard, as the cab 104 is rotated and/or repositioned relative to the frame 102, and the pin 730 may engage the catch 710, resulting in the pin 730 and/or the cab cross-member 726 engaging the catch 710 and/or the frame 102. According to an exemplary embodiment, this results in the force (or a portion thereof) being transferred from the cab 104, through the pin 730 to the catch 710, and into the frame 102.

In this sense, the components at the front of the cab 104 (e.g., the side-plate 728, a front bumper, a grill, etc.) are configured to receive an initial force, the cab 104 is configured to rotate about a lateral axis and/or move relative to the frame 102, causing components of the cab 104 (e.g., the cab cross-member 726, the pin 730, etc.) to engage components of the chassis (e.g., the catch 710, the frame 102) and transfer the force (or a portion thereof) from the cab 104 to the chassis (e.g., the frame 102). According to an exemplary embodiment, the components of the cab integrity system described above are configured to increase the integrity of the cab of a vehicle (e.g., the cab 104 of the pumper fire truck 100), and reduce vehicle component failure. In some embodiments, the pin of the cab (e.g., the cab cross-member 726 and/or the pin 730, another suitable structural stop) and/or the catch of the chassis (e.g., the catch 710, another suitable structural brace) are configured to create additional shear planes in order to reduce the force on other vehicle components (e.g., reduce rotational forces, moment-load forces, etc. applied to bolts, brackets, mounts, etc. of the cab and/or the chassis). In other embodiments, the pin of the cab (e.g., the cab cross-member 726 and/or the pin 730, etc.) and/or the catch of the chassis (e.g., the catch 710, etc.) are configured to transfer a force (or a portion thereof) from the cab to components of the chassis (e.g., the frame 102).

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A firefighting vehicle, comprising:
   a chassis having a frame member, the chassis coupled with a plurality of wheels;
   a catch coupled with the frame member;
   a rear assembly coupled to the frame member, the rear assembly supported by a rearward portion of the frame member;
   a cab movably coupled with the frame member, the cab supported by a forward portion of the frame member and the frame member extending longitudinally between the cab and the rear assembly, wherein the cab includes:
      a cab frame member coupled with the frame member, the cab frame member extending longitudinally between a front end of the cab and a rear end of the cab;
      a cab cross-member coupled with the cab frame member, the cab cross-member extending laterally from the cab frame member;
      a pin bracket having a pin receiving area, the pin bracket coupled to an exterior surface of the cab frame member; and
      a pin received within the pin receiving area to couple the pin with the pin bracket and position the pin within the cab cross-member such that the pin extends laterally from the exterior surface of the cab frame member within the cab cross-member,
   wherein the catch is coupled with the frame member rearward relative to the pin, and
   wherein in response to a force being applied to the front end of the cab, the cab is configured to move relative to the frame member and the pin is configured to engage the catch.

2. The firefighting vehicle of claim 1, wherein the frame member comprises a base section, a top section, and a bottom section, and wherein the catch is coupled with the base section and the top section of the frame member.

3. The firefighting vehicle of claim 2, wherein the catch is a hook including a sloped surface configured to engage the pin, and wherein the sloped surface forms an acute angle with the top section of the frame member.

4. The firefighting vehicle of claim 3, wherein in response to the force being applied to the front end of the cab, the sloped surface is configured to position the pin at the top section of the frame member.

5. The firefighting vehicle of claim 1, wherein the cab cross-member is an elongated structure tube and the pin is an elongated structural member, and wherein the pin is positioned within the cab cross-member.

6. The firefighting vehicle of claim 1, further comprising:
an additional frame member coupled with the cab and the rear assembly, the additional frame member parallel with the frame member and extending longitudinally between the cab and the rear assembly; and
an additional catch coupled with the additional frame member; and
an additional pin coupled with the cab cross-member, wherein the additional catch and the catch are separated laterally by a first distance, and wherein the additional pin and the pin are separated laterally by a second distance.

7. The firefighting vehicle of claim 6, wherein the additional catch is positioned on the additional frame member rearward relative to the additional pin; and
wherein in response to the force being applied to the front end of the cab, the cab is configured to move relative to the additional frame member and the additional pin is configured to engage the additional catch.

8. A firefighting vehicle, comprising:
a chassis having a frame member, the chassis coupled with a plurality of wheels;
a catch coupled with the frame member;
a rear assembly coupled to the frame member, the rear assembly supported by a rearward portion of the frame member;
a cab coupled with the frame member, the cab supported by a forward portion of the frame member and the frame member extending longitudinally between the cab and the rear assembly, wherein the cab includes:
a cab frame member coupled with the frame member, the cab frame member extending longitudinally between a front end of the cab and a rear end of the cab;
a cab cross-member coupled with the cab frame member, the cab cross-member extending laterally from the cab frame member;
a pin bracket having a pin receiving area, the pin bracket coupled to an exterior surface of the cab frame member; and
a pin received within the pin receiving area to couple the pin with the pin bracket and position the pin within the cab cross-member such that the pin extends laterally from the exterior surface of the cab frame member within the cab cross-member,
wherein in a first position the catch and the pin are separated longitudinally by a first distance, and in a second position the catch and the pin are separated longitudinally by a second distance, the second position responsive to a force being applied to the front end of the cab.

9. The firefighting vehicle of claim 8, wherein in the first position the catch is positioned rearward relative to the pin by the first distance.

10. The firefighting vehicle of claim 9, wherein the first distance is 0.75 inches.

11. The firefighting vehicle of claim 9, wherein the first distance is a maximum of 2.5 inches.

12. The firefighting vehicle of claim 9, wherein in the second position the catch is positioned rearward relative to the pin and the second distance is 0 inches.

13. The firefighting vehicle of claim 9, wherein in the first position the catch is positioned rearward relative to the pin, in the second position the catch is positioned rearward relative to the pin, and the first distance and the second distance are the same.

14. A cab assembly, comprising:
a cab body;
a first cab frame member and a second cab frame member extending longitudinally between a front end of the cab body and a rear end of the cab body;
a cab cross-member extending laterally between the first cab frame member and the second cab frame member;
a pin bracket having a pin receiving area, the pin bracket coupled to an exterior surface of the first cab frame member; and
a pin received within the pin receiving area to couple the pin with the pin bracket and position the pin within the cab cross-member such that the pin extends laterally from the exterior surface of the first cab frame member within the cab cross-member to the second cab frame member,
wherein in response to a force being applied to the front end of the cab body, the pin is configured to engage a catch.

15. The cab assembly of claim 14, wherein the cab cross-member is an elongated structural tube and the pin is an elongated structural member, and wherein the pin is positioned within the cab cross-member.

16. The cab assembly of claim 14, further comprising an additional pin coupled with the cab cross-member, wherein the additional pin and the pin are separated laterally by a first distance, and wherein in response to the force being applied to the front end of the cab body, the cab body is configured to move relative to the additional frame member and the additional pin is configured to engage an additional catch.

* * * * *